United States Patent [19]

Kronsbein

[11] 4,366,054

[45] Dec. 28, 1982

[54] FILTER

[76] Inventor: Dirk G. Kronsbein, Habsburger Strasse 12, 400 Düsseldorf 11, Fed. Rep. of Germany

[21] Appl. No.: 215,406

[22] Filed: Dec. 11, 1980

Related U.S. Application Data

[63] Continuation of Ser. No. 23,255, Mar. 23, 1979, abandoned.

[30] Foreign Application Priority Data

Mar. 31, 1978 [DE] Fed. Rep. of Germany ....... 2813864

[51] Int. Cl.$^3$ .............................................. B01D 23/14
[52] U.S. Cl. ...................................... 210/266; 55/487; 210/283; 210/284
[58] Field of Search .................. 55/487; 210/266, 282, 210/283, 284, 287, 290, 295, 299, 312, 314, 315, 316, 317, 335, 435, 452

[56] References Cited

U.S. PATENT DOCUMENTS

| | | | |
|---|---|---|---|
| 522,819 | 7/1894 | Ball et al. | 210/283 |
| 3,295,689 | 1/1967 | Arvanitakis | 210/283 |
| 3,327,859 | 6/1967 | Pall | 210/282 |
| 3,950,251 | 4/1976 | Hiller | 210/282 |

*Primary Examiner*—Ivars C. Cintins
*Attorney, Agent, or Firm*—Toren, McGeady and Stanger

[57] ABSTRACT

A filter assembly particularly for the filtration of compressed air and other compressed gases as well as for air and liquids is formed with a pair of porous support jackets having a filter element located therebetween and defining an inlet side. The filter element is composed of a plurality of layers of filter material having different porosities with the finely porous layer being covered, at least on its surface facing the inlet side of the filter assembly, by a less finely porous layer and the filter element is particularly characterized in that it contains active charcoal.

14 Claims, 6 Drawing Figures

FILTER

This is a continuation of application Ser. No. 023,255, filed Mar. 23, 1979, now abandoned.

BACKGROUND OF THE INVENTION

The invention relates to a filter for the filtration of compressed air and other compressed gases as well as air and liquids, including porous support-jackets between which a filter-element is located the filter-element being composed of several layers of varying porosity, with the finely porous layer being covered, at least on its surface facing the inlet side, of said filter assembly by a less finely porous layer.

The quality of compressed air is of great importance, especially for breweries and bottling plants. The ambient atmosphere contains, under normal conditions, up to 140 million of contaminant particles per $m^3$. The contaminant particles include pollen, flower dust, mildew and wild yeast. These impurities are not retained by the suction filter of a compressor, since they are much too small. Their size is between 0.00001 and 0.002 mm. To this is added an atmospheric humidity of from 50 to 80%. In addition, the atmosphere is enriched during compression with the pressure from the compressor. For example, the initial volume is reduced to a fifth by compression to 4 bar. This means that a five-fold concentration results. This is also true of the oxygen content.

At constant temperatures of e.g. 30° C. and 100% atmospheric humidity as well as the multiplied oxygen concentration, ideal conditions for the growth of microorganisms are produced in compressed air lines and containers. This constitutes for breweries and bottling plants a high risk of infection or deterioration of taste.

In the case of so-called working atmosphere without special requirements for atmospheric sterility, oil-lubricated compressors also find frequent application. The compressed air then receives additional contamination from the lubricating oil. The lubricating oil is oxidised under the influence of the markedly increased oxygen content and of the compression temperature, which can reach up to 200° C. and more in the compressor. The lubricating oil becomes strongly aggressive under these influences. This and the other impurities of the compressed air largely contribute to wear in all compressed air units.

As a result of extra-fine dispersion, the impurities form aerosols. This means that they remain suspended in the compressed air and diffuse throughout the whole compressed air system.

This can be counteracted only to a slight extent by conventional separation methods, such as centrifugal separation or separation with sinter-metal separators or ceramic separators.

Decisive criteria for the quality of a filter are its tool life and filtering action. The invention is based on the problem, therefore, of improving the tool life and filtering action.

SUMMARY OF THE INVENTION

This problem is solved according to the invention by the fact that the filter-element contains active charcoal. The multi-layer filter coats of varying porosity impart to the filter-element, in comparison with other filters, considerably longer tool life, with increased, constant filtering action. This is to be ascribed to the fact that particles of different size penetrate to a different depth into the filter. In this case, large particles do not reach the extra-fine filter zone, but are retained in advance, whereas small particles penetrate to the core of the filtering medium. This results in the most favourable particle size distribution conceivable within the filtering medium and an excellent quality of compressed air arises if the filter is used, for example, for the filtration of compressed air. The active charcoal absorbs the impurities of the medium flowing past. This is to be understood as the sorption and compression of gases or of dissolved substances on the surface of the active charcoal. The quantity of the adsorbate rises with the gas pressure, so that the filter, provided with active charcoal according to the invention, possesses particularly high adsorptive capacity in compressed air units.

Active charcoal, comminuted by milling and with varying particle size, is suitable for the filter. In that case, a special distribution of the particle sizes occurs, so that the medium to be filtered first impinges in the filter on coarse particle active charcoal and, subsequently, on fine particle active charcoal. The coarse particle active charcoal is located in the coarse filter zone and the fine particle active charcoal in the fine filter zone. Particle sizes of between 1 and 4 mm are suitable for the coarse zone and particle sizes of under 0.1 mm for the fine zone. The smaller the particle size, the greater the adsorptive capacity of the active charcoal.

Advantageously, the micro-fibre fleece, enclosed between two concentric support-fleeces in the manner of a sandwich structure, permits the use of extra-finely ground and binder-free active charcoal. The active charcoal can advantageously develop its maximum adsorptive capacity without any binder in the filter according to the invention. The support fibre fleece, arranged in succession in the direction of flow, advantageously acts as a second filter. It filters off even extra-fine charcoal particles, entrained by the medium to be filtered. At this stage, the microfibre fleece separates particles of down to 0.01 $\mu$m. Unsaturated hydrocarbons, present even in oil-free compressors in the compressed air, as well as unpleasant odours are similarly adsorbed. The discharged, filtered medium is virtually clean and sterile. This results in a quality of compressed air, which is better than the breathable air according to DIN (German Industrial Standard) 3188. It is completely neutral regarding odour and taste.

The coarse particle active charcoal, placed in front of the fine particle active charcoal in the direction of flow of the medium to be filtered, can be located in pockets, between which there is always a gap, which is closed at its end in the direction of flow of the medium to be filtered. The gap between adjacent pockets increase the filtering surface, i.e. the surface towards which the medium to be filtered flows. The larger the number of pockets, the larger the filtering surface. In this case, the pockets can be arranged so that the gaps run in the axial direction and/or in the peripheral direction.

The closed end of the gap forces the medium that flows into the gap to flow through the pockets. Particularly marked turbulence of the medium to be filtered occurs in the pockets, with particularly long contact time with the active charcoal. Similarly, the resistance to flow is much smaller, in comparison with known filters with bonded charcoal particles.

The pockets permit the use of binder-free active charcoal; they afford the necessary support to the active charcoal in the filter, without impairing its adsorptive capacity. For this purpose, the active charcoal particles may be so loosely placed in the pockets that the distribution of the medium flowing into the pockets attains its optimum there and flows around the charcoal particles on all sides. The loose arrangement, for example, arises from loose packing.

The pockets consist of fabrics with synthetic fibres, which can be easily welded. The welding-seams are advantageously located together at the end of each gap or in the marginal zones of the filter. In this way, the porosity of the fabric is not impaired by the welding-seams and the closure of all the previously open pores between the fibres, which accompanies the welding operation, with suitable choice and layering of the fibres, is utilised for the closure of the gap-ends between the pockets and for producing tight edge-strips on the filter-element. The tight edge-strips facilitate the sealing of the filter-element at its points of contact with the filter-housing.

The various features of novelty which characterize the invention are pointed out with particularity in the claims annexed to and forming a part of this disclosure. For a better understanding of the invention, its operation advantages and specific objects attained by its use, reference should be had to the accompanying drawings and descriptive matter in which there are illustrated and described preferred embodiments of the invention.

DESCRIPTION OF THE PREFERRED EMBODIMENT

Figure 1:
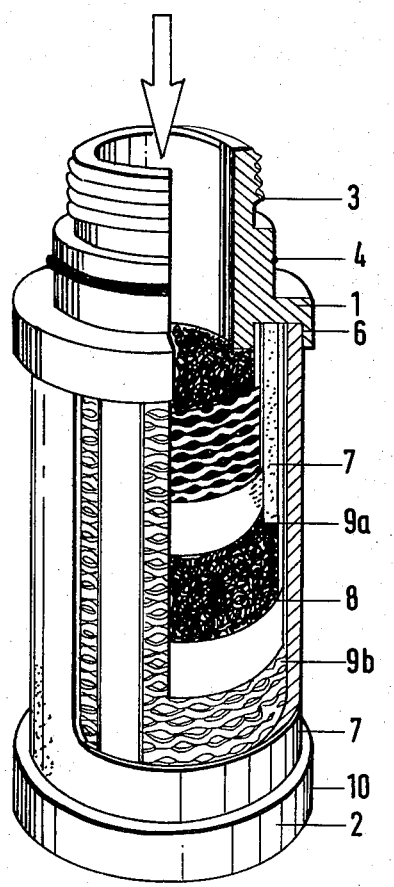
FIG. 1 shows an illustration, in perspective, of a filter according to the invention in cartridge construction, partially broken away.

The cartridge-filter according to the invention possesses an upper lid 1 and a lower lid 2, between which a hollow cylinder is located. All metallic parts consist of stainless steel or aluminum and the packings consist of a temperature-stable sealing material.

The upper lid 1 is provided with a central straight-way aperture with an external thread 3, which extends coaxially to the cartridge and serves for the insertion of the cartridge into the supply lines 15 of a housing 16. A surrounding washer 4, located between the upper lid 1 and the external thread 3, ensures that the housing zone 17, which feeds the medium to be filtered and ends in the interior of the cartridge, is hermetically separated from the hollow space of the housing 18, which surrounds the cartridge and contains the filtered medium.

Figure 2:
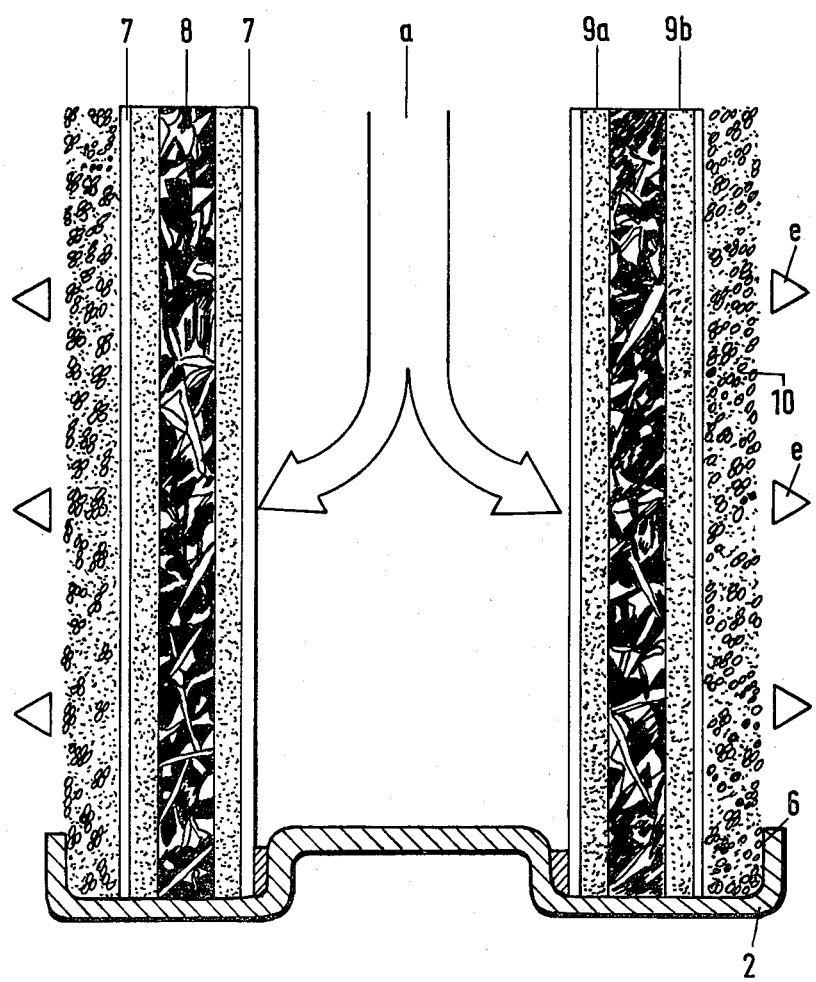
FIG. 2 shows a diagrammatic cross-section through the filter.

The arrow a in FIG. 2 indicates the entry of the medium to be filtered, which leaves the cartridge purified on the outside,—indicated by the arrow-points e. A flange on the lower lid 2 also serves for the separation of the housing-zone 17 from the hollow space of the housing 18. The flange is located on the periphery and in the central zone; its shape on the inner side is such that the hollow cylinder of the filter-element can be placed into a peripheral groove 5. An identical peripheral groove, with inverse curvature, is located in the lid 1. The upper lid 1 and the lower lid 2 are tightly sealed to the hollow cylinder by means of adhesives 6.

The hollow cylinder, according to FIG. 1 and 2, consists of concentric material rings. The innermost material ring is a high-grade steel support-jacket 7, made of wire-mesh or of a punched metal sheet, which is provided with a pattern of passage apertures and bent. A metal sheet of this kind, for example, is formed by punching slots or holes, which lie close to one another and essentially run in the peripheral direction of the support-jacket 7, and subsequent stretching of the metal sheet. It may then be described as expanded metal.

The innermost high-grade steel support-jacket 7 is surrounded, on the outside, by a support fibre fleece 9a. A micro-fibre fleece 8 follows, which, in turn, is enclosed by a support fibre fleece 9b. This assembly is surrounded by a further outer high-grade steel support-jacket 7, which is manufactured in the same way as the inner high-grade steel support-jacket. Accordingly, the support fibre fleeces 9a and 9b are located between the high-grade steel support-jackets 7 and the micro-fibre fleece 8 between the support fibre fleeces 9a and 9b. The support fibre fleeces 9a and 9b consist of hydrophobic nylon fibres and, again, are binder-free, but not as finely porous as the micro-fibre fleece 8.

The micro-fibre fleece is composed of hydrophobic glass fibres, arranged in layers without binder. Extra-finely ground active charcoal is introduced between the glass fibres during the arrangement into layers or afterwards. In this composition, the micro-fibre fleece 8, in the unused condition, has a hollow space of 80%.

The support fibre fleeces 9a and 9b have various purposes. They serve as coarse filter, in relation to the micro-fibre fleece 8 and, together with the support-jackets 7, as a firm support for the micro-fibre fleece 8 in any direction of flow of the medium to be filtered. In this connection, the sandwich structure, produced by the high-grade steel support-jackets 7, the support fibre fleeces 9a and 9b and the micro-fibre fleece 8, stands up even to considerable pressures. Besides, the arrangement of the support fibre fleeces 9a and 9b and of the high-grade steel jackets 7 on both sides of the micro-fibre fleece 8 permits an effective reversal of flow, for example for the purpose of purifying the filter-element.

If the filter is used for separating oil from compressed air, an additional foamed plastics jacket 10, surrounding the outer high-grade steel jacket 7, offers a further guarantee that aerosols are filtered out.

In the filtration of compressed air, the contaminated compressed air, which is to be filtered, first flows through the inner support fibre fleece 9a. This retains micro-organisms and other particles down to a size of from 0.005 to 0.001 mm. The finer particle of down to 0.00001 mm are trapped in the micro-fibre fleece 8.

Figure 3:
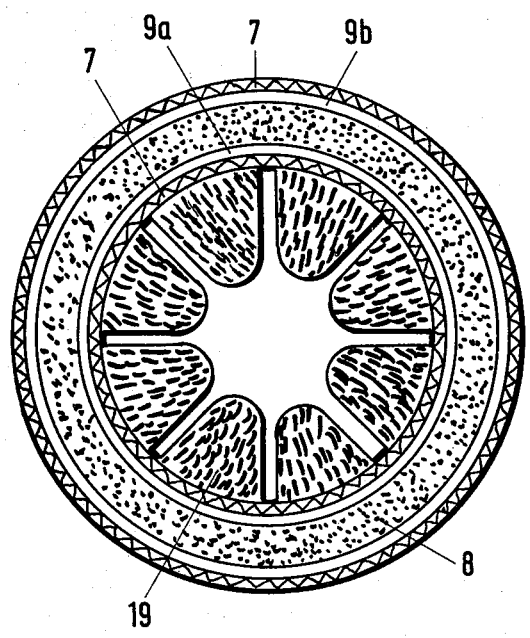
FIG. 3 shows a further filter according to the invention, in diagrammatic cross-section.
Figure 4:
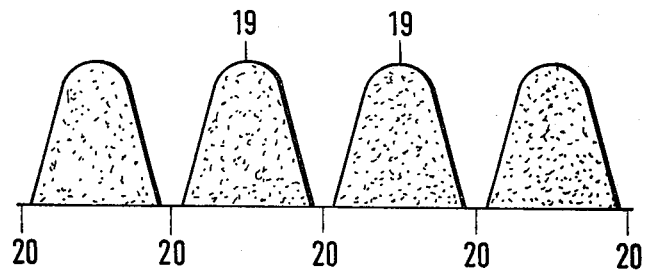
FIGS. 4 and 5 show details of the filter according to FIG. 3.
Figure 5:
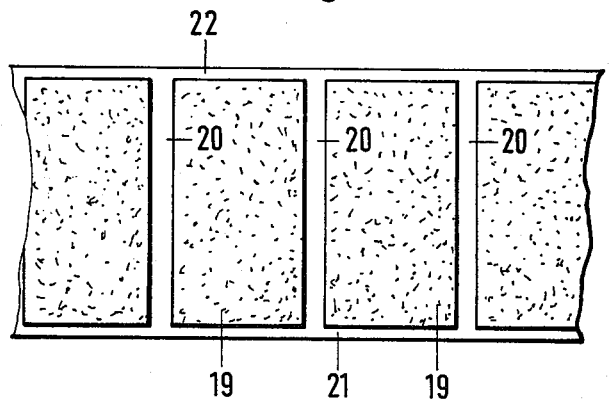

According to FIGS. 3 to 5, the hollow cylinder between the lids 1 and 2 is provided, on the inside, with an additional filter-layer, which comprises segment-like pockets 19, made of nylon fabric.

The pockets 19 consist, for example, of two superimposed lengths of fabric. The lower length or radially outermost layer of fabric is in flush contact, with the innermost support jacket 7 whereas the upper length or radially innermost layer of fabric is formed in loops and is sealed or welded to the lower length of fabric at each point of the loop that faces the lower length of fabric by means of welding-seams, which engage between the loops and extend across the entire width of the fabric.

The welding-seams 20 extend in the longitudinal direction of the loops forming the pockets 19, and at right angles to the longitudinal direction of the lengths of fabric. Subsequently, the upper and the lower lengths of fabric are welded to each other at one edge. Coarsely milled or coarsely crushed active charcoal can then be filled into the other, open, end of the pockets 19 at the opposite edge of the lengths of fabric. After the filling of the pockets 19, the open ends of the pockets are closed by a welding-seam 22 in the same way as the pocket-ends, closed by the welding-seam 21. The pressing of the edges of the upper length of fabric against the lower length of fabric, required for the welding of the seams 21 and 22, causes bevelling of the pocket-ends.

The upper length of fabric, which is to be placed in loops, can also be replaced by a length of fabric with pre-fabricated pockets or by individual pre-fabricated pockets, which are filled, in the initially open condition, with coarse particle active charcoal and then welded with a superimposed length of fabric.

All the lengths of fabric, provided for the pockets 19, are binder free and can simply consist of fibres that are made to mesh by a special layering process.

The completed pockets 19 are rolled together during assembly and inserted into the inner high-grade steel support-jacket 7 of the hollow cylinder. The pockets 19 then lie against the inner high-grade steel support-jacket 7 with their lower lengths of fabric, as shown in FIG. 4, and, in the axial direction, they coextend with the high-grade steel support-jacket 7. This means that the edges of the pockets 19, formed by the welding-seams 21 and 22, run flush with the edges of the inner high-grade steel support-jacket 7, so that the lids 1,2 can surround the hollow cylinder, together with the edges of the pockets 19, formed by the welding-seams 21 and 22.

In the assembled state, the pockets 19 possess, between any two adjacent pockets 19, a gap, which runs along the corresponding welding-seam 20 and in the axial direction of the hollow cylinder and enlarges the conveying surface for the medium to be filtered.

The coarse particle active charcoal in the pockets 19 represents a first adsorption step for the medium that flows towards it and is to be filtered. The second adsorption step is performed by the micro-fibre fleece 8 with the extra-finely ground active charcoal.

Figure 6:
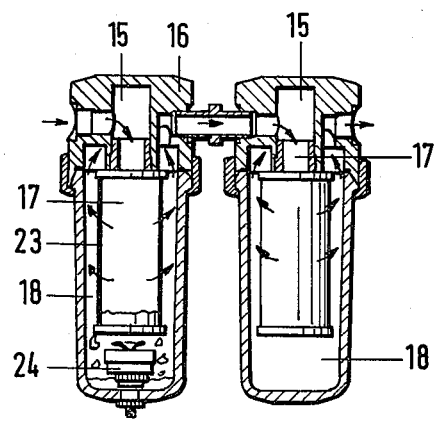
FIG. 6 shows an application, according to the invention, of the filters according to FIGS. 1 to 5.

According to FIG. 6, the filter in accordance with FIGS. 1 and 2 or 3 to 5 finds application in a filter-combination with a filter-element 23, made up in the same way as the filter according to FIGS. 1 and 2, but without active charcoal addition. The filter-element 23 forms a first filtration step for the medium to be purified, in which oil, water and dirt are separated. The quantity of water, accumulating with compressed air, is quite considerable, since, after compression of compressed air and a compressed air temperature of, for example, 50° C. behind the after-cooler and cooling to 10° C. occurring in the compressed air system, water accumulation of 72 g/m³ of air arises. At a compressor output of 300 m³/hour and a pressure of 4 bar, 4.3 liters of water are transferred per hour into the compressed air system in this way.

The water and oil, separated by the filter-element 23, escape through an automatic condensate-drain 24, located at the bottom of the filter-housing 16.

The filter with the filter-element 23 is followed by a filter with active charcoal according to FIGS. 1 and 2 or according to FIGS. 3 to 5. The subsequent active charcoal filter adsorbs all oil vapours and odours. The compressed air, leaving the filter-combination after the filtration of compressed air, is completely sterile and free from corrosive ingredients.

While specific embodiments of the invention have been shown and described in detail to illustrate the application of the inventive principles, it will be understood that the invention may be embodied otherwise without departing from such principles.

I claim:

1. In a filter assembly for the filtration of compressed air and other compressed gases, as well as for air and liquids such as oil and water, said assembly being in the shape of a hollow cylinder, and comprising:

a filter element having several layers with varying porosity;

inner and outer porous support jackets between which at least a portion of said filter element is located, said inner porous jacket operating at the inlet side of said filter assembly, said filter element including a finely porous layer covered on either side with a less finely porous layer;

said filter element having a plurality of said filter layers containing active charcoal of different grain size, and in which said finely porous layer is constructed as a micro-fibre fleece and contains most finely ground active charcoal free of binding agent;

an upper and lower cover for said assembly;

the filter element being located between said upper cover and said lower cover, said upper cover to be connected to an inlet line and opening into a hollow space; and said lower cover tightly sealing the filter element.

2. A filter assembly according to claim 1, wherein said filter element includes a layer, internal to said inner jacket, having means defining a plurality of pockets and wherein coarse particle active charcoal is contained within said pockets.

3. A filter assembly according to claim 2, wherein said coarse particle active charcoal is loosely packed.

4. A filter assembly according to claim 1, wherein said filter element includes a layer, internal to said inner jacket, having means defining a plurality of pockets arranged to define between said pockets a gap formed as a flow channel through which a medium to be filtered may pass, said flow channel having an inlet at one end and being closed at its other end.

5. A filter assembly according to claim 1, which is generally shaped in the form of a hollow cylinder, said filter element further including means internal to the inner jacket defining a plurality of pockets circumferentially distributed adjacent each other around said cylindrical configuration, said pockets being formed to contain therein filter material and being defined to comprise dimensions extending in the radial and in the longitudinal directions of said filter assembly.

6. A filter assembly according to claim 2 or 5, wherein said means defining said pockets consist of binder-free fabric.

7. A filter assembly according to claim 6, wherein said fabric defining said pockets consists of synthetic fibers.

8. A filter assembly according to claim 7, wherein said synthetic fibers are welded between said pockets.

9. A filter assembly according to claim 7, wherein said fibers are welded at the edges of said pockets.

10. A filter assembly according to claim 9, wherein said finely porous layer of said filter element has at least 60% of its volume composed of hollow space.

11. A filter assembly according to claim 2 or 5, wherein said pockets are formed with a projecting edge extending in the axial direction of said filter assembly.

12. A filter assembly according to claim 1, wherein said filter element comprises a filter medium consisting of hydrophobic fibres.

13. A filter assembly according to claim 1, wherein metallic parts of said filter assembly, including said support jackets and covers, consist of one of the metals stainless steel and aluminum.

14. A combined filter assembly including a first filter assembly having an outlet portion according to claim 1, connected to a second filter assembly of the same type, both assemblies located in the flow stream of the medium to be filtered, said first filter assembly having a condensate drain.

* * * * *